United States Patent [19]

Smith

[11] 4,289,792
[45] * Sep. 15, 1981

[54] MICROWAVE TREATMENT OF FOOD PRODUCTS

[76] Inventor: Donald P. Smith, 4530 Woodfin Dr., Dallas, Tex. 75220

[*] Notice: The portion of the term of this patent subsequent to May 20, 1992, has been disclaimed.

[21] Appl. No.: 21,261

[22] Filed: Mar. 16, 1979

Related U.S. Application Data

[62] Division of Ser. No. 687,982, May 19, 1976, Pat. No. 4,154,861.

[51] Int. Cl.³ ............................................. A21D 6/00
[52] U.S. Cl. ............................ 426/241; 219/10.55 R; 426/243
[58] Field of Search ............... 426/234, 243, 241, 237, 426/233, 524, 466, 520, 523, 474, 475, 476; 219/10.55 A, 10.55 M, 10.55 R, 10.55 E, 10.55 F, 400, 388; 99/475, 477, 478; 34/34, 39, DIG. 9

[56] References Cited

U.S. PATENT DOCUMENTS

| | | | |
|---|---|---|---|
| 3,514,576 | 5/1970 | Hilton et al. | 219/400 |
| 3,692,968 | 9/1972 | Yasuoka | 219/10.55 E |
| 3,821,454 | 6/1974 | Lobel | 426/455 |
| 3,854,024 | 12/1974 | Kaufman, Jr. et al. | 219/10.55 A |
| 3,884,213 | 5/1975 | Smith | 219/400 |
| 3,905,760 | 9/1975 | Johansson et al. | 219/400 |

Primary Examiner—Joseph M. Golian
Assistant Examiner—George C. Yeung
Attorney, Agent, or Firm—Gerald G. Crutsinger; John F. Booth; Harry C. Post, III

[57] ABSTRACT

Directed jets of temperature controlled gaseous fluids are applied to irregularly shaped products, such as food portions, to subject discrete areas of the surface to a very high heat transfer rate and to cause these areas to be passed over surfaces of the product at a proper rate to obtain over-all surface effects such as crisping, browning, searing or freezing.

The cooking apparatus comprises a generator adapted to supply microwave energy for heating the interior of a food product in combination with apparatus to direct spaced discrete high velocity jets of heated air to impinge against exterior surfaces of the food product. A conveyor is employed to provide relative motion between each of the sources of heat and the product for averaging cooking through the product by reducing effect of RF standing waves and simultaneously sweeping the jets of air over the product at proper rate to heat all exposed surfaces.

6 Claims, 18 Drawing Figures

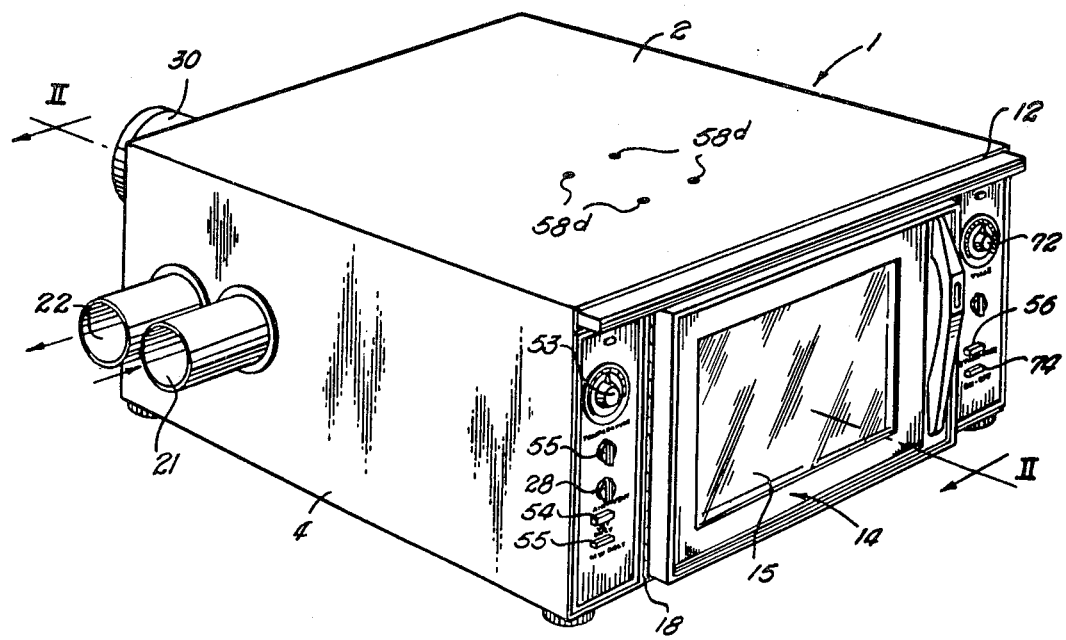
Fig. I
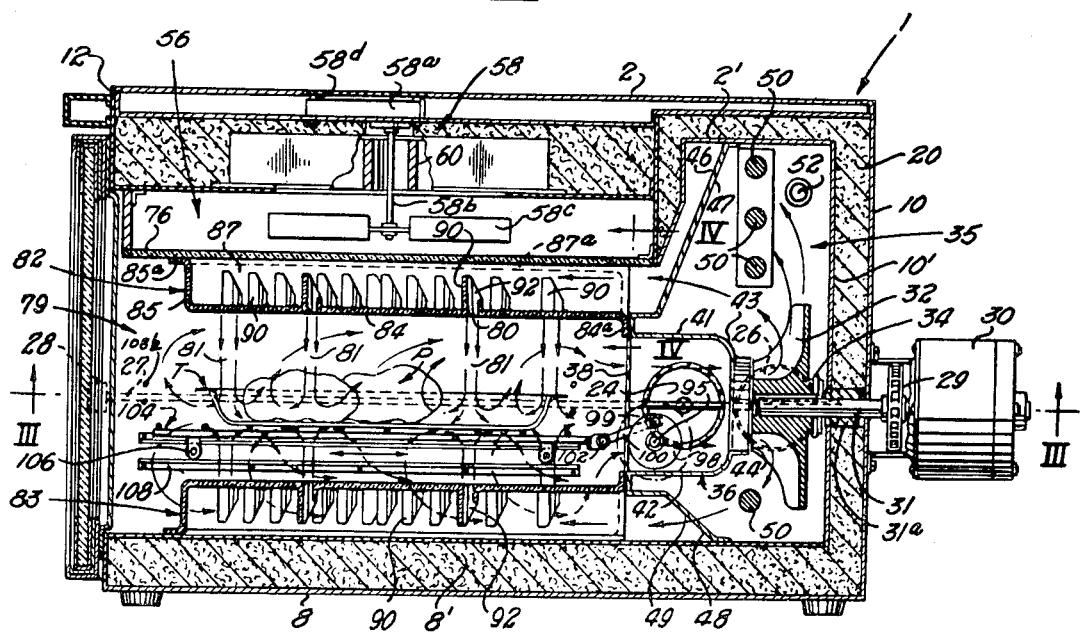
Fig. II

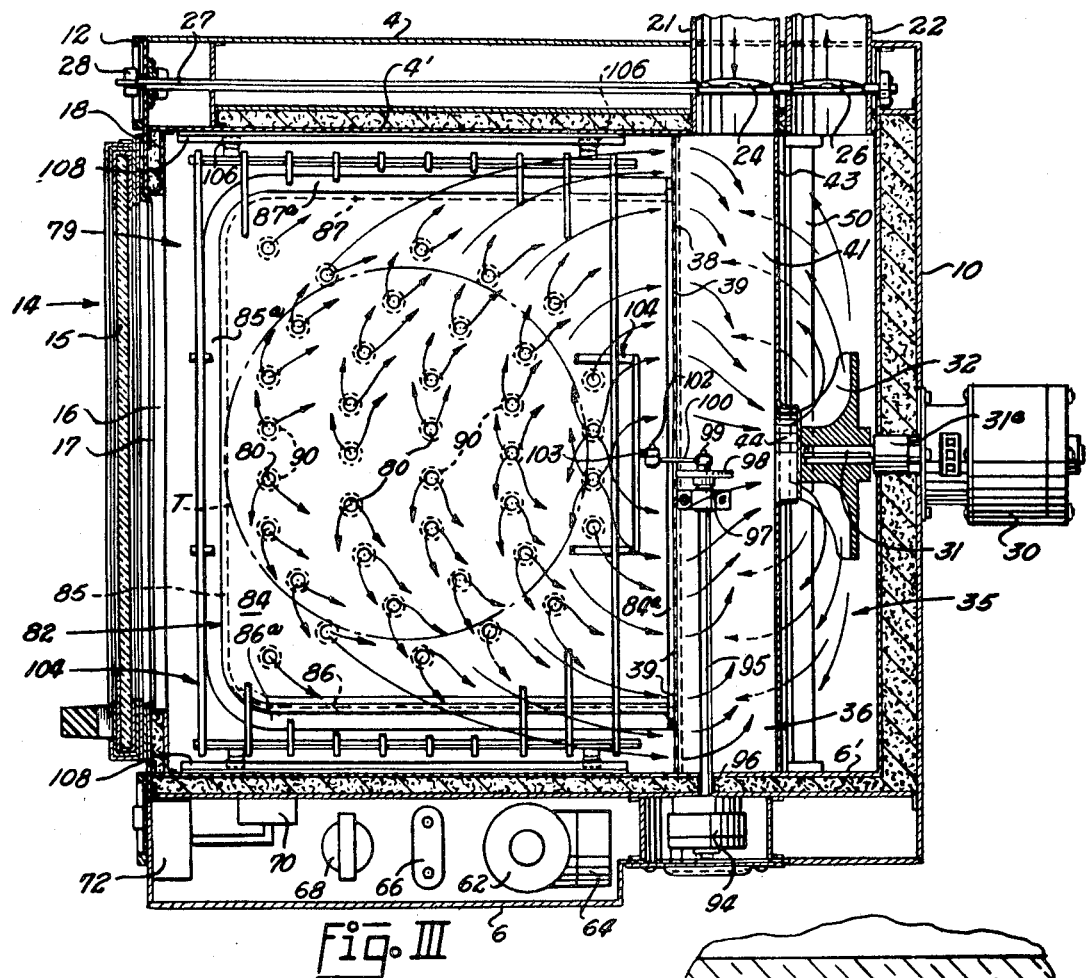
Fig. III
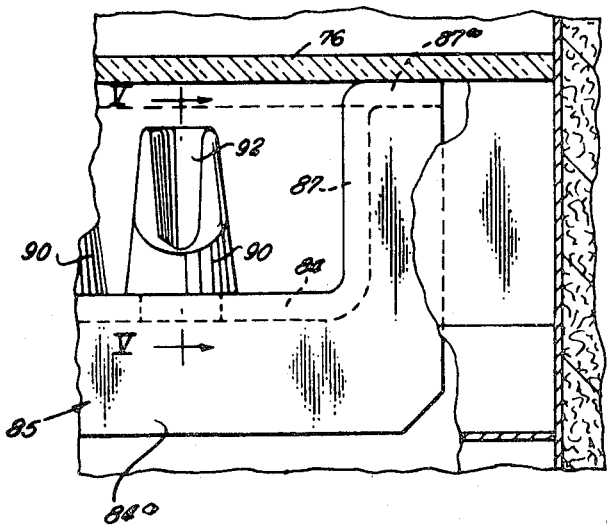
Fig. IV
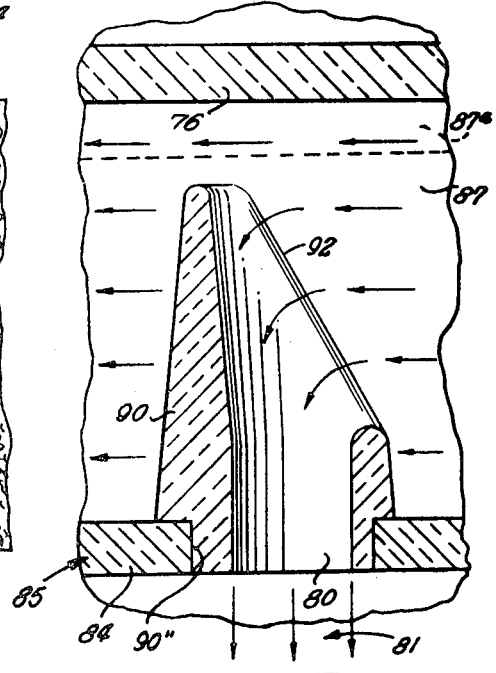
Fig. V

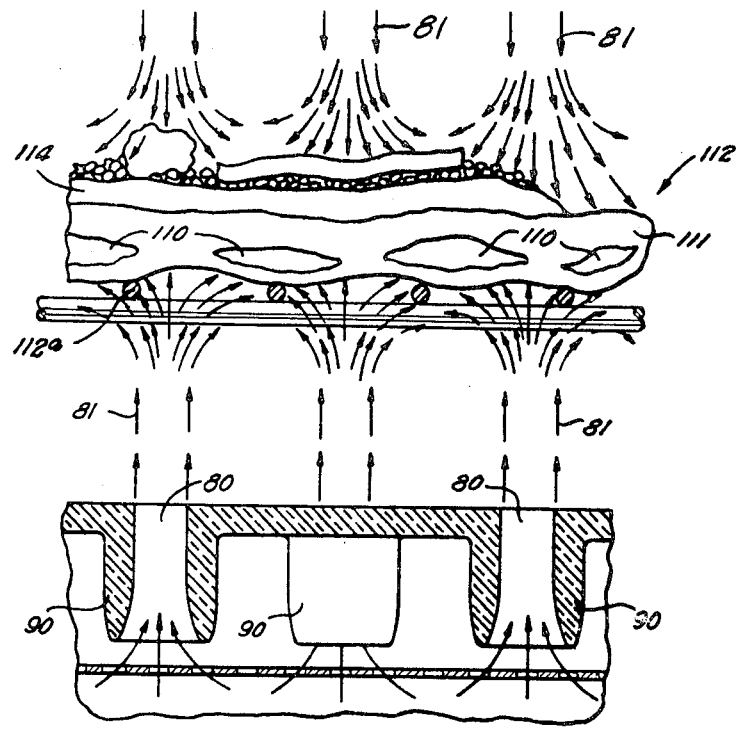
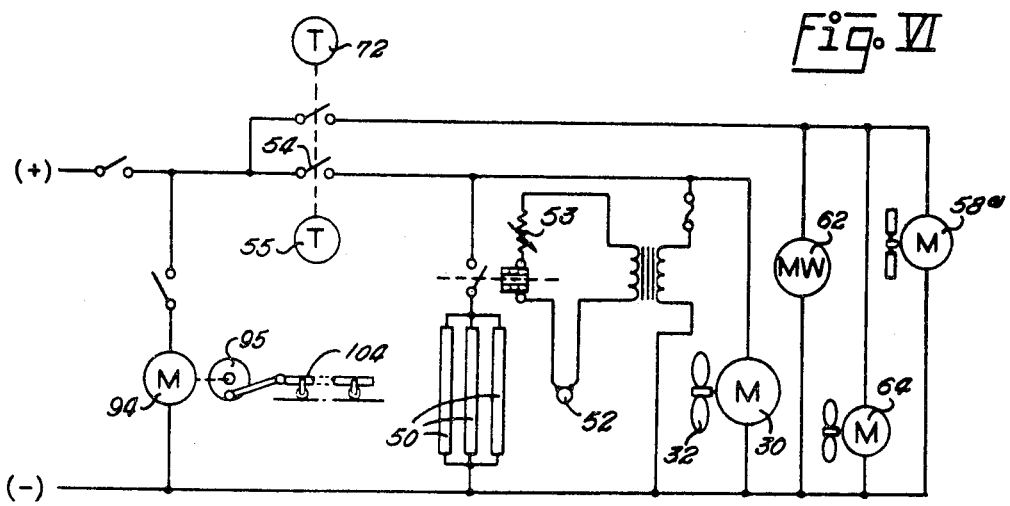
Fig. VI
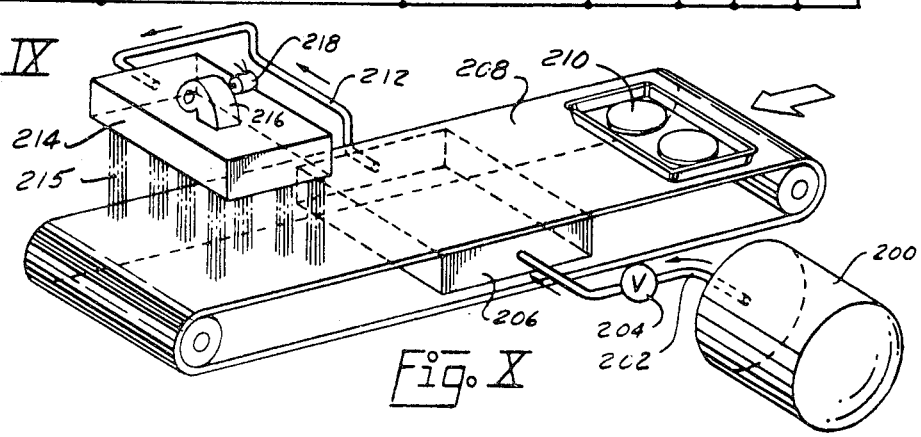
Fig. IX
Fig. X

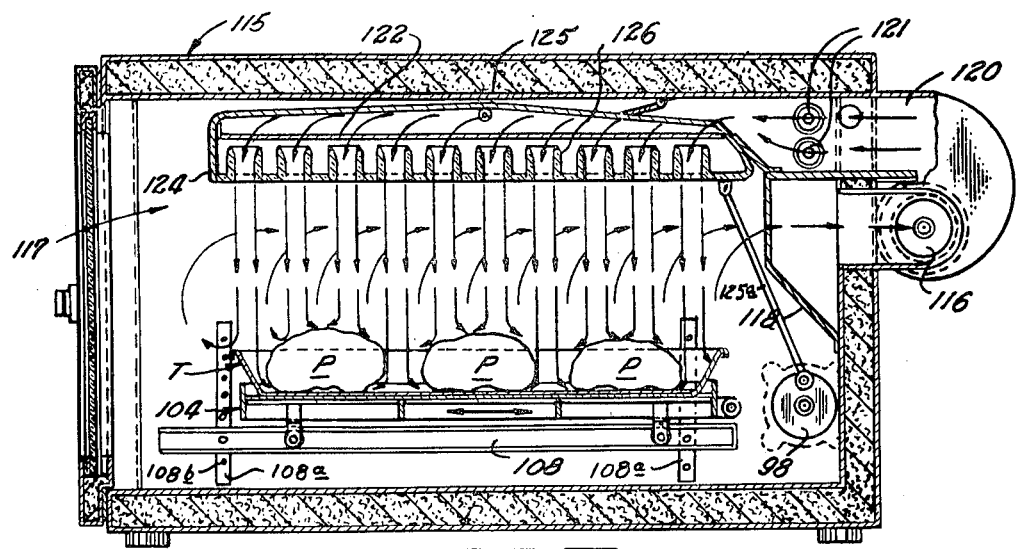
Fig. VII
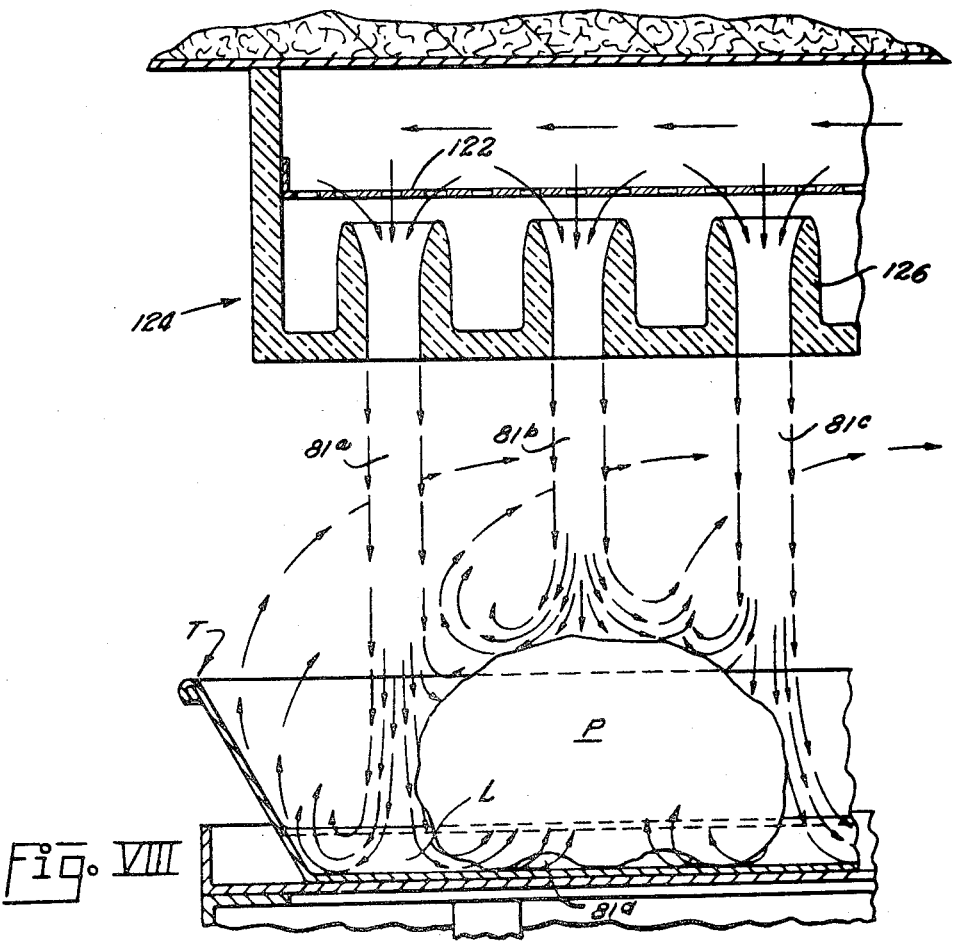
Fig. VIII

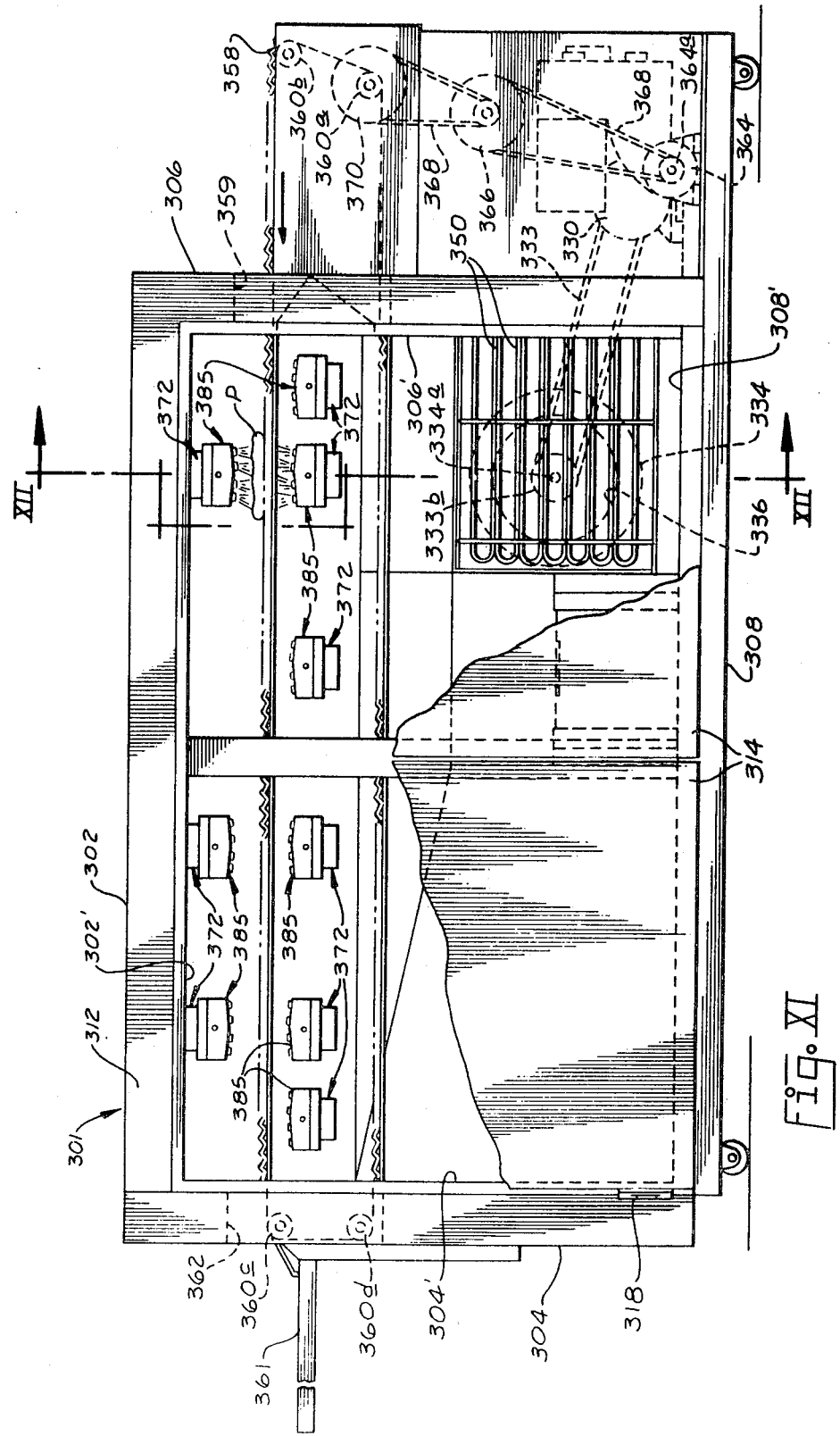

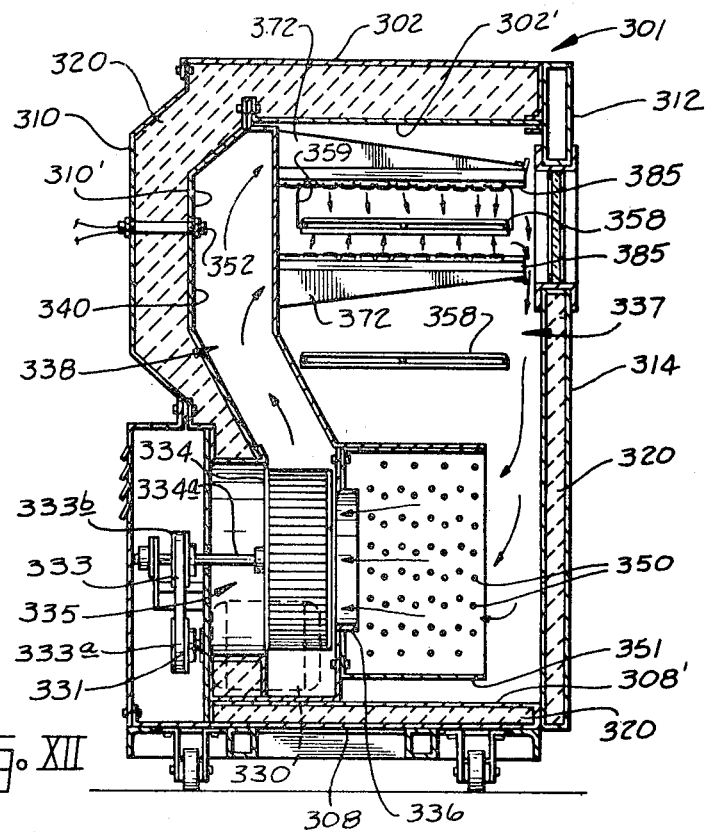
Fig. XII
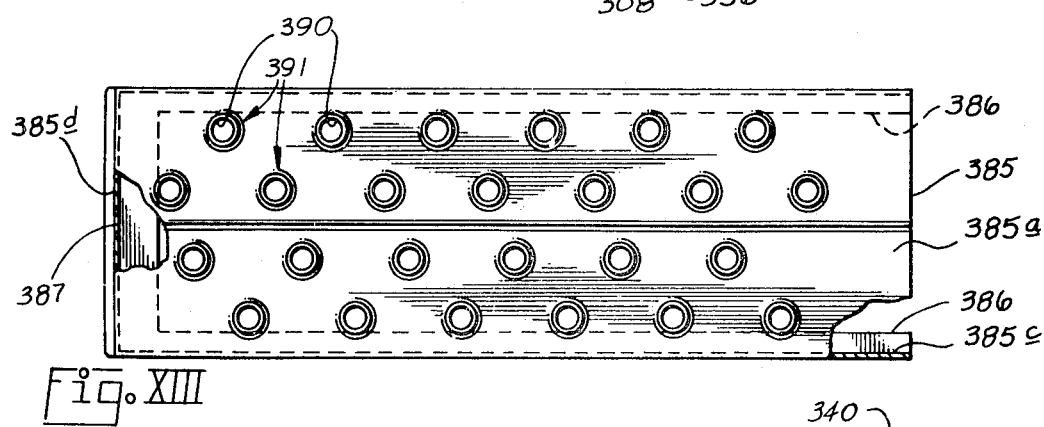
Fig. XIII
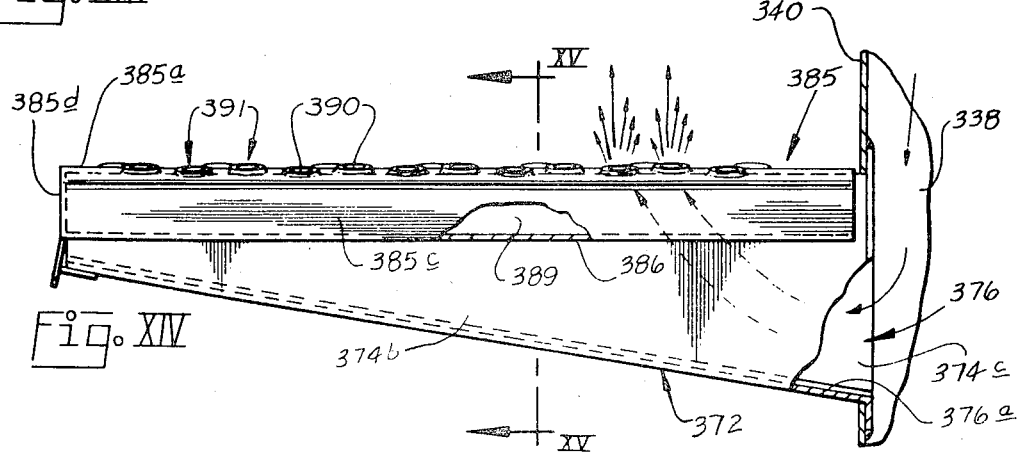
Fig. XIV

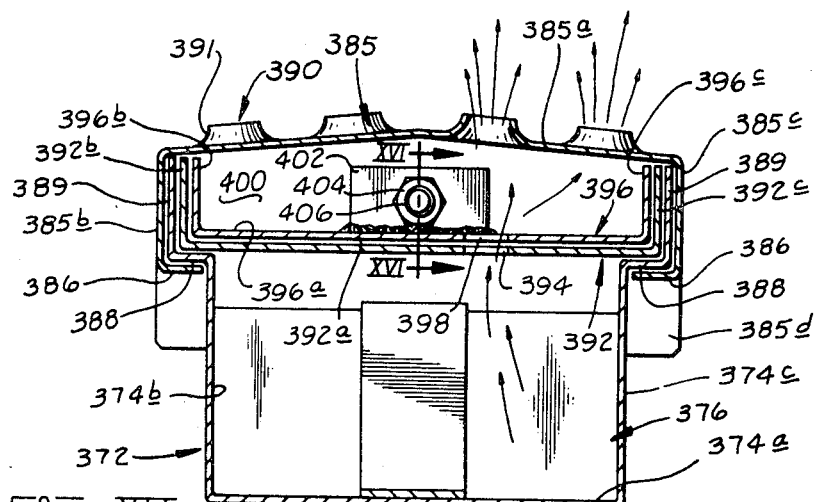
Fig. XV
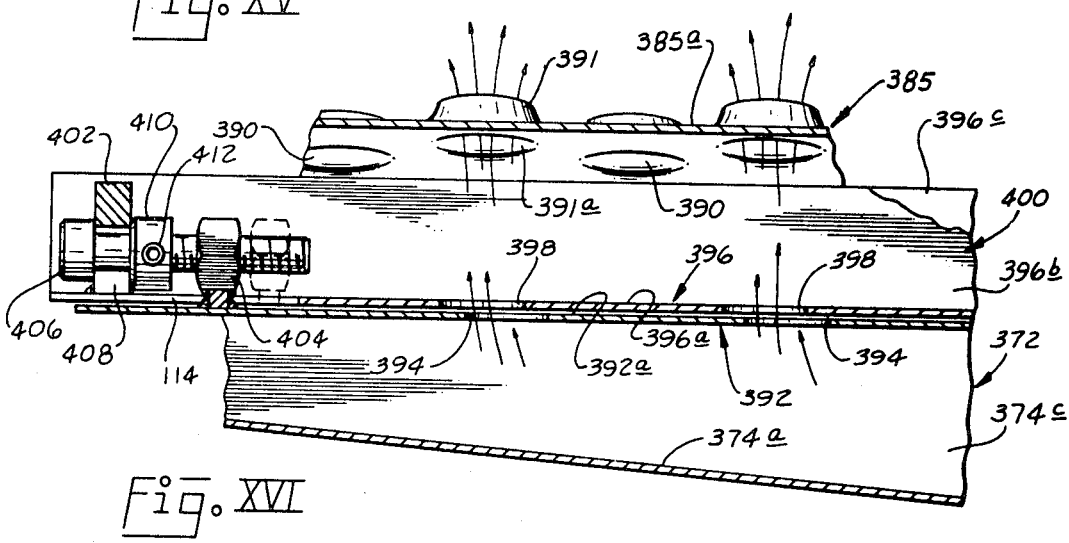
Fig. XVI
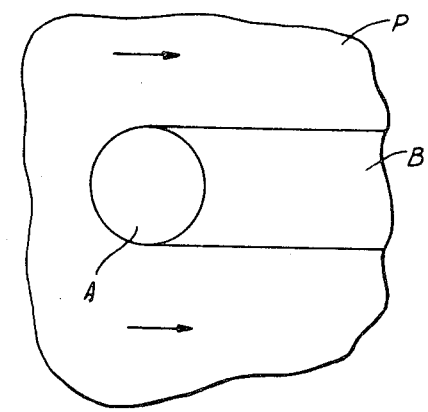
Fig. XVII
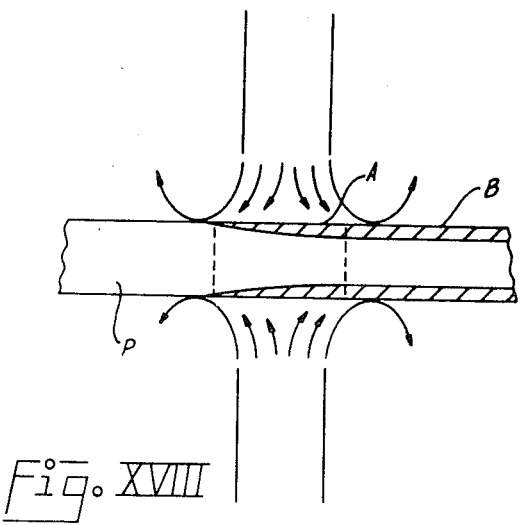
Fig. XVIII

MICROWAVE TREATMENT OF FOOD PRODUCTS

CROSS-REFERENCE TO RELATED APPLICATION

This application is a division of application Ser. No. 687,982, filed May 19, 1976, now U.S. Pat. No. 4,154,861 and relates to improvements in structure disclosed in U.S. Pat. No. 3,884,213.

BACKGROUND OF INVENTION

Heating of foods for eating induces many complex chemical and physical changes in the food. These changes and desirable conditions for enjoyable consumption are often very transient. The essential properties of temperature, texture, flavor, odor and appearance all change relatively rapidly during preparation and serving of most foods.

Microwave ovens have been employed heretofore to provide rapid internal heating of food products. However, many food products depend upon surface heating effects for texture, flavor, odor and appearace, so that microwave energy alone does not provide acceptable heating of these food products.

Infra-red radiation and hot air convection with microwave have been employed for food cooking or baking as well as for reheating previously prepared foods with limited success.

Particular difficulty has been encountered in thawing, cooking, and browning foods, such as frozen fish, meat patties, chicken parts and pies.

Microwave energy can be very effectively employed to thaw frozen foods because the heating effect penetrates deeply into the frozen food. Microwave energy passes through ice much more readily than through water in foods. For example, half power depth of microwave at 3,000 megahertz in ice at −12 degrees centigrade is 685 millimeters, while water at 26 degrees centigrade would absorb the same portion of the energy in 0.80 centimeter.

Microwave is very advantageous in thawing thick sections. However, heating of exterior surfaces of frozen food products thaws the surface, and the thin outer layer of thawed food material preferentially absorbs microwave and interferes with deep thawing. Thus, it is desirable to provide proper programming of the internal heating and surface heating when thawing frozen foods and heating them for serving.

Forced convection type heaters heretofore devised have been incapable of providing controlled transfer of heat to the surface of food products to accomplish crisping, browning, or searing within the short time required to heat food with microwave.

Forced convection ovens in which air heated to 500 to 550 degrees Fahrenheit, is circulated by a fan longitudinally through a microwave oven for heating exterior surfaces of a food product require proper shaping and composition of food portions.

Apparatus of the forced convection type generally provides insufficient external heating to the product within the time required for cooking internal portions of the product with microwave. Further limitations of forced convection heating devices heretofore devised result in burning low heat sink areas such as flaky blisters or pastries or projecting points on vegetables and meats before properly finishing high heat sink areas such as solid dough between blisters and relatively flat dense areas of meat.

The apparatus disclosed in U.S. Pat. No. 3,514,576 employed a fan to circulate heated air through to cooking compartment in a closed system to conserve heat in an effort to provide sufficiently high temperature for rapid surface heating of food products. It should be appreciated that such a system prevents turning off surface heating apparatus quickly and, if high intensity heat is employed, requires immediate removal of food products upon completion of a cooking cycle.

During the cooking process foods release grease, pryolysis products, volatile organic materials and water which deposit on walls and surrounding parts. If these products are diluted during food heating or between heating operations, the concentration of volatile or suspended materials does not accumulate to give as much deposition on the oven surfaces as in a closed system.

It is important to note that accumulation of grease and other materials in fine particles on hot surfaces results in oxidation, rancidity and oven odor. Unless an oven is cleaned thoroughly and frequently, this odor can be transferred into new food. In addition, the accumulated materials on oven surfaces may be burned by microwave heating causing arcing in the oven and damaging parts thereof as a result of overheating.

Microwave ovens heretofore devised have offered significant advances in internal heating. However, microwave energy has not heretofore been employed in combination with apparatus to provide optimum exterior characteristics to cooked food products, particularly for crisping, searing or browning moist food.

The knowledge of separable or coincident internal and surface heating which the use of microwave makes possible leads to understanding and improvements in the state of the art of surface heating of food products whose dimensions or composition do not require the use of microwave for rapid heating.

For example, thin pizza sheets of pastry with tomato paste, cheese and other toppings heat rapidly from only surface heating. Many pizza ovens have stone or low conductivity material to limit heat transfer rate to the bottom of the pizza. When the crust of the pizza blisters, as is desirable to make flaky tender crust, the blister surface is thin and browns. The blister lifts the surface of the pizza crust away from the heating surface and the more dense dough between the blisters bakes much more slowly. Thus, the thin shell of the blisters overbake and the areas between blisters bake much more slowly. One result of this effect is that pizzas must be baked relatively slowly to avoid soft dough between the crisp blisters.

Another example of food product which requires controlled surface heating, but is not necessarily assisted by microwave heating is French fried potatoes.

Since there are no sections of the long thin potato pieces which are far removed from the outer surface thereof, the product can be rapidly warmed by surface heating. Usually this is done by frying in hot oil because it is necessary to crisp and brown the outside of the piece without excessive drying of the inside. Microwave heating of previously prepared French fried potatoes leaves them warm, but soggy and tasteless. Still, air oven heating dries the whole piece before the surface becomes crisp or brown. Infra-red heating browns or crisps only points adjacent ends of the pieces and the upper surfaces.

It should be appreciated that some of the problems which are encountered in transferring heat to a surface are also encountered in cooling or freezing products.

Freezing of foods products is usually least harmful to the product and evaporative loss is reduced when cooling is accomplished rapidly.

Cryogenic freezing, wherein liquid such as nitrogen having a very low boiling point applied to the product, is relatively expensive because the "spent" vapor is usually discharged continually at a very low temperature.

The rate of freezing in blast freezing, wherein cold air is forced over the product, is limited by the rate of heat transfer to cold air form the product when the air travels generally parallel to the surfaces.

SUMMARY OF INVENTION

I have devised an improved method of heat transfer and improved apparatus to apply rapid heating or cooling to food products. The method and apparatus employ jets of air or other gaseous fluid to create discrete areas of very high heat transfer. This high heat transfer accomplishes advantageous surface effects of crisping, browning, searing or freezing in those localized areas where the jets impinge against the surface of the product.

When the heat transfer jets are of proper size, spacing, temperature, velocity and direction, very advantageous surface effects are obtained. When the properly constituted jets are caused to pass over the surface of the food at a selected rate, these effects are spread evenly over the surface.

The improved cooking comprises apparatus, having a microwave generator arranged to provide internal heating of food products, in combination with, apparatus for forming a plurality of spaced discrete jets of heated air which are directed over the surface of the product. Means is provided for imparting relative motion between the product to be heated and the jets of heated air causing the jets to sweep across the surface of the product for elimination of boundary layers of air and moisture and to provide rapid external heating while eliminating standing waves of microwave energy to provide uniform heating throughout the product.

Crisping, browning, or searing cannot be accomplished on the surface of food as long as moisture migration and evaporation keep the surface damp and cooler than the boiling temperature of the moisture. Moist foods need to be heated to surface temperatures of approximately 300 degrees Fahrenheit to set the components and to remove sufficient water to give surface crispness. Rapid browning requires heating to about 350° F. and searing or grilling effects require heating to about 400° F. or higher.

Causing spaced discrete high velocity jets, for example 500 to 4,000 feet per minute, to impinge against and sweep over the surface of food produces alternately high and low pressure areas on the surface. Progressive edges of the impinging jets cause a sweeping action and a low film coefficient effect which results in rapid heat transfer and removes water from the surface faster than moisture can migrate from the center toward the surface. The rate of the sweeping action is important to obtain optimum surface effects on foods. Sweeping too rapidly reduces the effectiveness of individual jets. Sweeping too slowly permits migration of moisture and heat to the surface of the product between jets.

Thus the sweeping jets, impinging against the surface, provide crisping, browning or searing on the surface without causing undesirable drying of the interior portions of the product. Such also heats the surface within the time interval required for microwave cooking such that browning, for example of chicken parts, is accomplished while the meat is cooking, rather than after it has been cooked, which contributes to taste.

Microwave heating of the interior of a moist food product causes the moisture to move toward the surface more quickly than slow warming. This moisture is removed by the sweeping jets at sufficient rate to accomplish crisping of pastries, browning of battered and breaded fried chicken, and searing of steaks as rapidly as the microwave warms the interior of the product and without drying out a thick surface layer.

A primary object of the invention is to provide cooking apparatus wherein discrete jets of heated high velocity air are moved across the surface of a product to provide rapid heating.

Another object of the invention is to provide cooking apparatus wherein microwave energy is employed for heating interior portions of a product in combination with apparatus for causing high velocity jets of heated air to impinge against the surface of the product to provide external heating thereof.

A further object of the invention is to provide cooking apparatus wherein microwave energy is employed for heating interior surfaces of a product in combination with apparatus for heating exterior surfaces of the product adapted to recirculate a portion of the air in the oven while mixing fresh air therewith for controlling the humidity within the chamber to facilitate crisping the outer surfaces of the product and to remove concentration of volatile and suspended materials from the atmosphere within the cooking area.

A further object of the invention is to provide cooking apparatus wherein discrete columnated jets of air are formed to impinge upon the surface of the product, said jets being spaced such that return air passes between the jets in a pattern so that one jet does not sweep under another jet as air returns to a blower for recirculation over a heating element.

A further object of the invention is to provide a high heat transfer rate apparatus in which jets consisting of a majority of water vapor are caused to sweep over the surface of the food product to warm it without dehydration because the moisture condenses on the cold product and then when the product becomes warm the moisture may be removed by the same hot sweeping jets to give the desired surface conditioning of the food.

A still further object of the invention is to provide a high heat transfer rate apparatus to advantageously cool food products by causing jets of gas to sweep over the surfaces of the food product.

Other and further objects of the invention will become apparent upon detailed description hereinafter following and to the drawings annexed hereto.

DESCRIPTION OF DRAWING

Drawings of preferred embodiments of the invention are annexed hereto so that the invention may be better and more fully understood, in which:

FIG. I is a perspective view of cooking apparatus having a microwave generator and apparatus for forming discrete columnated jets of heated air therein;

FIG. II is a cross-sectional view taken substantially along line II—II of FIG. I;

FIG. III is a cross-sectional view taken along line III—III of FIG. II;

FIG. IV is an enlarged cross-sectional view taken along line IV—IV of FIG. II;

FIG. V is an enlarged cross-sectional view taken along line V—V of FIG. IV;

FIG. VI is an enlarged diagrammatic view illustrating actions of jets on the lower surface of the product;

FIG. VII is a cross-sectional view similar to FIG. II of a modified form of the cooking apparatus;

FIG. VIII is an enlarged diagrammatic view illustrating the action over irregular surfaces of the product;

FIG. IX is a wiring diagram;

FIG. X is a diagrammatic view of a modified form of the apparatus used for cooling food products;

FIG. XI is a front elevational view of a modified form of the apparatus used for cooking food products;

FIG. XII is a cross-sectional view taken along line XII—XII of FIG. XI;

FIG. XIII is an enlarged plan view of the jet plate above with parts broken away to more clearly illustrate the details of construction;

FIG. XIV is a side elevational view of the jet plate and duct with parts broken away to more clearly illustrate the details of construction;

FIG. XV is a cross-sectional view taken along line XV—XV of FIG. XIV; and

FIG. XVI is an enlarged cross-sectional view taken along line XVI—XVI of FIG. XV;

FIG. XVII is an enlarged diagrammatic view illustrating actions of the jet on the surface of the food product; and FIG. XVIII is a cross-sectional diagrammatic view thereof.

Numeral references are employed to designate like parts throughout the various figures of the drawing.

DESCRIPTION OF A PREFERRED EMBODIMENT

Referring to FIGS. I and II of the drawing, the numeral 1 generally designates cooking apparatus comprising an outer shell forming a top 2, sides 4 and 6, bottom 8, backwall 10 and frontwall 12.

Front wall 12 has an opening formed therein to which door 14 is hingedly connected. Door 14 is of conventional design comprising panels 15 and 17 of glass having a perforated metallic sheet 17 therebetween to provide visibility through the door while providing thermal insulation and shielding to prevent the escape of microwave energy. Door 14 is pivotally connected by hinge 18 to the front wall 12 and is secured in a closed position by suitable latching apparatus. A safety lock which (not shown) may be employed to prevent energizing electrical circuits while the door is open.

To insulate cabinet 1 to prevent transfer of heat through the walls thereof an interior cabinet comprising top 2', sides 4' and 6', bottom 8' and back 10' is positioned inside the outer cabinet and insulation material is positioned therebetween.

As is best illustrated in FIGS. I and III, vent pipes 21 and 22 extend through side walls 4 and 4' of the cabinet and have dampers 24 and 26, respectively, disposed therein. Dampers 24 and 26 are connected to a rod 27, having a knob 28 on the outer end thereof, extending through the front wall 12 of the cabinet for controlling the circulation of air through the interior of the cabinet thus providing means for controlling humidity in the cabinet and means to remove vapor and smoke from the interior of the cabinet to facilitate browning outer surfaces of food products and to maintain the cooking compartment relatively clean and free of odor.

Means is mounted in cabinet 1 for forming jets of heated air which are directed to impinge against a food product. As best illustrated in FIGS. II and III of the drawing, such means comprises a variable speed motor 30 having an output shaft 31 to which is secured an impeller 32 by suitable means such as set screws 34. The output shaft 31 preferably extends through a stationary sleeve 31a extending through the back wall 10 of cabinet 1.

Impeller 32 is mounted in a plenum 35 separated from the cooking compartment by an air intake duct 36 extending transversely across the inside of cabinet 1 and having opposite ends secured to inner walls 4' and 6'. Intake duct 36 comprises a perforated metallic sheet 38 having perforations 39 formed therein and having upper and lower ends connected across the open side of a trough having substantially U-shaped cross-section. The trough comprises upper and lower legs 41 and 42 connected by a back wall 43 having an opening 44 formed therein.

Impeller 32 is positioned adjacent opening 44 such that air is drawn through perforations 39 in the sheet 38 to the inside of the inlet duct 38 and through opening 44 by impeller 32.

Metallic sheet 38 preferably has upwardly and downwardly extending portions 46 and 48 secured thereto for forming a shield to prevent escape of microwave energy from the cooking compartment. The upwardly extending portion 46 of sheet 38 has perforations 47 extending therethrough while the downward extending portion 48 has perforations 49 formed therein to diffuse the output of impeller 32.

Heating elements 50 are arranged for heating air in plenum 35. While heating elements 50 may assume any suitable configuration, such as a flame heated heat exchanger, a steam heated device, or an electrical resistance heating element, in the particular embodiment of the invention illustrated in FIG. II, the heating elements are Calrods (sold by General Electric Co.) which are electrically heated for transferring heat to air flowing thereacross. It should be appreciated that jet plate 82, described hereinafter, could be constructed of dielectric material or could have electrical resistor elements imbedded therein to provide heating of air moving thereacross.

A thermostat sensor 52 is mounted in the plenum 35 and is connected through suitable circuitry (FIG. IX) for controlling heating of Calrods 50. Thermostat sensor 52 is controlled by conventional control apparatus 53 mounted on the frontwall 12 of cabinet 1.

An on-off switch 54 is mounted on the front 12 of the cabinet for directing electrical current to motor 30 and to the thermostat control apparatus 53 which delivers electrical current to calrods 50. Sensor 52 of the thermostatic controlled device is of conventional design, for example, a liquid filled bulb.

The upper portion of cabinet 1 has a chamber 56 formed therein in which a source of microwave energy 58 is mounted.

Microwave generator 58 is of conventional design comprising a stirrer motor 58a having an output shaft 58b upon which stirrer 58c is mounted. Motor 58 is secured to the top 2 of cabinet 1 by bolts 58d.

A microwave input tube 60 is connected to the output pipe or the lead of a source of high frequency electromagnetic energy, for example, a magnetron 62 best illustrated in FIG. III.

Magnetron 62 is of conventional design which is air cooled by a blower 64 and connected through condensor 66, transformer 68, diode 78, automatically reset timer switch 72 and on-off switch 74 to a source of alternating current electricity.

Timer 72 is preferably of the type which can be set to maintain magnetron 62 in an energized condition for a specified period of time to energize the blower motor 30 the same period of time unless switch 55 is open to prevent energizing the blower for a pre-established period of time.

As will be hereafter more fully explained, the microwave energy and the jets of heated air, for best results, do not necessarily operate on identical time cycles. For example, it may be desirable to provide microwave energy for a time interval of six minutes while jets of heated air are employed for surface browning of the product only during the last two minutes of the interval during which microwave energy is applied.

Thus, to operate, switch 74 is closed and after the oven reaches a desired temperature timer 72 would be set to maintain magnetron 62 and blower motor 30 in an energized condition for a period of two minutes while timer 55 would be set to energize the magnetron 62 for four minutes and then activate timer 72 for turning on motor 30 and continuing the microwave for a period of two minutes. Thus the surface of product P would be browned or seared simultaneously with cooking of the outer portion thereof. Such timer cycling would also permit thawing of frozen food and partial cooking prior to application of heat to outer surface.

The cooking cycle would be initiated by pressing cook button 56. When cooking is completed the timers would automatically reset the same cycle. The timers can be readjusted to program proper heating for other products.

For cooking certain food products, the microwave energy is absorbed more efficiently if moisture is removed from the exterior surface of the food. In such instance it would be desirable to turn on motor 30 and heating element 50, or prior to turning on the microwave generator. Separate sources of energy would be controlled by the "microwave only" switch 55 or "jet only" switch 54.

As best illustrated in FIG. II chamber 56 in which microwave generator 58 is connected has a plate 76 disposed across the lower end thereof.

As best illustrated in FIGS. II and III of the drawing, a jet plate 82 has a substantially flat portion 84 having sidewall 85, 86 and 87 extending outwardly therefrom and secured to insulator plate 76. The rear edge of the flat portion 84 of jet plate 85 is positioned in abutting relation with metallic sheet 38.

Flanges 48a, 85a, 86a and 87a preferably extend outwardly from respective portions of jet plate 85, as best illustrated in FIGS. III and IV of the drawing, to facilitate attachment of jet plate 82 to insulator plate 76 and metallic sheet 38.

The flat portion 84 of jet plate 85 has a plurality of spaced passages 80 extending therethrough about which tubes 90 are secured.

Plates 76 and 82 are preferably constructed of material which is partially microwave transparent, such as glazed earthenware, porcelain, heat tempered low expansion glass, organic plastic materials or silicone rubber materials. Such materials can be formulated such that plates 76 and 82 absorb from 1% to 25% of the microwave energy to protect the magnetron and the components of the oven from accumulating too high an energy level when the microwave is turned on with little or no food or other load in cooking compartment 79. This also permits use of containers which reflect microwave energy.

Plates 76 and 82 constructed of material which is heated by microwave energy transfers excess localized heat to air circulated over the surface thereof so that circulating air prevents over-heating of the plate.

Referring to FIG. V, tubes 90 preferably have a minimum length which is greater than the diameter of passage 80. Each passage 80 is preferably less than aproximately 1.5 inches in diameter such that air flowing through tube 90 and out of passage 80 moves in a columnated jet 81 which is projected away from jet plate 82.

The jets are arranged in pattern such as that shown in FIG. III so that air from one jet can return to the blower without passing under another jet. The spacing between columnar or lineal jets is over twice the minimum width of the jet so that the proper return air space is provided between the discrete jets so that returning air does not interfere with successive jets.

In the embodiment of the invention illustrated in FIGS. IV and V, tube 90' has an inclined upper surface aerodynamically shaped to form an air scoop such that pressurized air moved by impeller 32 through apertures 47 in the upwardly extending portion 46 of metallic plate 38 will be deflected downwardly through passages 80 to form of discrete jets 81 which impinge upon surfaces of a food product as illustrated in FIG. II. Tubes 90' are illustrated as separate elements insertable into apertures 90" in plate 85' to facilitate manufacturing an in certain applications to prevent cracking as a result of thermal expansion.

A lower jet plate 83 is provided in the lower portion of cooking compartment 79 for directing columnated jets upwardly to engage the lower surface of a food product P. Jet plates 82 and 83 are of identical design in the illustrated embodiment.

Jet plate 83 is positioned against the bottom wall 8' and in abutting relation with a lower portion 48 of metallic sheet 38.

Impeller 32 moves heated air through apertures 49 in the downwardly extending portion 48 of metallic plate 38 into the air scoop 92 of tubes 90.

As best illustrated in FIG. III, passages 80 in jet plates 82 and 83 are not positioned in rows parallel to walls 4' and 6' of the cooking compartment 79. In the configuration of passages 80, illustrated in FIG. III of the drawing, the openings are spaced somewhat circumferentially about an axis spaced laterally from the center of jet plate 82 toward opening 44 formed in the rear end of air return duct 36 through which air is drawn by impeller 32.

Passages 80 are spaced apart a distance of at least two times the diameter of opening 80 and a distance less than about twenty times the diameter of each passage 80. Such spacing permits flow of diffused air resulting from impingement of jets 81 against the surface of the food product through spaces between the jets to the air return duct 36 to prevent interference between the return air and the jets 81. Such spacing also results in application of discrete areas of high and low air pressure over the surface of the product permitting impinging air to flow over the surface to an adjacent low pressure area.

As indicated at 81d in FIG. VIII. Further, juice or gravy on the surface or products, such as hamburger meats, is moved over the surface of the product to provide self-basting.

Openings 80 in the lower jet plate 83 are similarly spaced.

Jets 81 preferably have a velocity in a range between 500 and 7,000 feet per minute and as illustrated in FIG. VI directed substantially perpendicular to the surface of the product such that the jets impinge against the surface. The optimum velocity of jets 81 will vary depending upon a particular application. Factors determining the velocity of the jets include the temperature of air delivered from plenum 35, the size of the average portion of product to be cooked, the nature of the product being cooked, the particular size of the product being heated and the like.

As best illustrated in FIGS. II and III of the drawing, discrete columnated jets 81 impinge against surface of the product P, for example chicken parts, potatoes, biscuits and the like. The high velocity jets of heated air provide rapid heat transfer to the product P at points where the jets impinge against the surface. To provide uniform heating over the surface of the product, means is provided for causing jets 81 to sweep uniformly across the entire surface of the product.

In FIG. II of the drawing, means for causing jets 81 to sweep across the surface of the product comprises a motor 94 having an output shaft 95 rotatably mounted in bearings 96 and 97. Shaft 95 has a crankplate 98 having a crankpin 99 secured thereto spaced radially from the centerline of drive shaft 95.

A link 100 is connected between crankpin 99 and pin 102 extending through an opening in a lug 103 secured to carriage 104. Carriage 104 has rollers 106 rotatably secured thereto for movement along the tracks or guide surfaces 108 secured to the sidewalls 4' and 6' adjacent opposite sides of the cooking chamber 79, by adjustable mounting 108a having spaced openings 108b to control spacing from jet plate 82.

Referring to FIG. III of the drawing, it should be readily apparent that rotation of a crank plate 98 imparts reciprocating movement of carriage 104 along racks 108 thereby moving the food product through cooking compartment 79 causing jets 81 of high velocity air to be swept across the surface of the product P.

If the oven is to be used for general purpose cooking, motor 94 is preferably a variable speed motor such that jets move across the surface of the product in speeds of one-half to twenty feet per minute.

I have found that air heated to 400° F. directed through apertures 80 which are 7/16 inch in diameter at a flow rate of 1,200 feet per minute will brown the surfaces of pre-fried breaded chicken parts most effectively if the jets sweep across the product at a rate of about 8 feet per minute. Browning under such conditions would be accomplished in approximately two minutes when employed in combination with microwave heating of the interior of the chicken parts.

Product P is preferably positioned in a suitable container such as tray T, which as illustrated in FIG. VIII preferably has raised ridges across the bottom thereof forming lands T' and grooves T" such that food product P is elevated permitting passage of air through the grooves or valleys T" under the product P for heating the lower surface thereof.

As viewed in FIG. VIII, jet 81a produces a high pressure area adjacent the left side of product P while the area immediately to the right of jet 81c, which is between jets, is a low pressure area. Heated air flows from high pressure means to the low pressure area transferring heat to the lower surface of the product P.

In FIG. VI as illustrated a diagrammatic view of the action of jets 81 for cooking a product such as pizza dough.

To make flaky crust it is necessary to cause blisters 110 to form as in soda crackers. When a pizza 112 is baked, the moist tomato sauce 114 keeps the top of the crust 111 moist so that crust baking is difficult. If the crust 111 is baked too quickly the blisters 110 form hard brittle bottoms on the blisters and the crust is doughy over the blister. Further, when the pizza is baked on a hot stove or in a pan the blisters lift the adjacent crust off the heating surface and baking must be done slowly to obtain crisp crust between the blisters.

Directing jets 81 of heated air substantially perpendicular to surfaces of the pizza 112 controllably heats both the top and bottom surfaces at a much higher rate and lower temperature than can be accomplished with still air or forced air convection ovens of the type heretofore employed.

Microwave heating generally is not employed for cooking thin pastry products such as pizza. In the modified form of the apparatus illustrated in FIGS. VI and VIII of the drawing, a modified form of the jet plate is illustrated in a cabinet 115 similar to that generally designated by numeral 1 in FIG. I of the drawing. However, the microwave generator has been omitted.

The cabinet 115, illustrated in FIG. VIII, has double walls with thermal insulation material therebetween.

An impeller 116 draws air from the cooking compartment 117 through a perforated plate 118 and discharges the air through a plenum 120 over heating elements 121. Plenum 120 has perforated diffuser plate 122 extending thereacross for diffusing air into space above jet plate 124. Jet plate 124 has upwardly extending tubes 126 spaced over the surface thereof for discharging columnized jets 81 in the manner heretofore described.

The jet plate 124 however is pivotally mounted on a shaft 125 and moved by link 125a secured to a crankplate 98.

Jets 81 are directed downwardly into engagement with the surface of product P, resting in a tray T supported by shelf 104.

As illustrated in FIG. VIII, high velocity jets 81 impinged against the upper surface of an irregular shaped product P to provide very rapid heat transfer and very rapid water vapor removal from the surface of the product. It should be appreciated that the sweeping air jets 81 provides relatively uniform heating for surfaces of odd shaped food products.

The action of sweeping jets 81 on a product P provides impingement lines of contact over the surface of product P, such as pieces of meats, pastry or vegetables, either in original baking or cooking or in reheating operations.

The embodiment of the jet plate 124 illustrated in FIG. VIII comprises a series of tubes 126 or slots which have sufficient length to make discrete parallel streams or jets 81 of air which can be projected for some distance from the surface of jet plate 124.

Jets 81, being streamlined, project areas of pressure which heat on the tops of irregular objects, which also sweep by the sides of irregular objects and then also cause pressure first on one side and then on the other side of the irregular objects. Thus, the heating effect is applied directly on top of the object, by a sweep effect on the sides of the object, and by differential pressure the air is caused to circulate effectively under the object if it is not flat on the supporting surface. It should be appreciated that the lands T' formed on the bottom of the tray T maintain product P elevated above the bottom surface of the tray.

It should further be appreciated that sweeping pressure jets 81 strike solid surfaces, such as tray T, such that the streamlined jet 81 is transformed into a turbulent mushroom shaped pressure area which effectively heats the underlying surface of any regular object.

It should be readily apparent that jet plate 124 is moved relative to the product P to accomplish the sweeping action hereinbefore described.

Another simple structure for accomplishing such result involves forming jet plate 124 in the configuration of a disc which can be rotated causing jets 81 to sweep across the surface of the Product P.

I anticpate the use of the sweeping jets impinging against the surface of a product for both heating and cooling a product. It should be appreciated that directing columnated jets of vaporized liquid nitrogen across the surface of product, as illustrated in FIG. X, will provide rapid freezing of the product.

In FIG. X is shown a tank 200 of liquid nitrogen, carbon dioxide, Freon, or other low boiling refrigerant. A pipe 202 is connected to valve 204 which delivers liquid to evaporator 206.

The evaporator 206 is positioned in heat exchange relation with conveyor 208 constructed of thermal conductor material, such as stainless steel. Heat from product 210 is transferred to the evaporator 206 causing the liquid from tank 200 to vaporize.

Vapor passes from evaporator 206 through line 212 into a plenum 214 having columnizing tubes or slots arranged to form discrete jets 215 which sweep across the surface of product 210 carried by the conveyor. Suitable means, such as a blower 216 driven by motor 218, is provided to control pressure in the plenum 214 and to recycle spent nitrogen through the plenum.

It should further be appreciated that conveyor 104 may be replaced with a belt type conveyor for employing sweeping jets of columnated fluid either separately or in combination with microwave energy for heating or cooling products for example to be served in a restaurant.

SECOND EMBODIMENT

A second embodiment of the cooking apparatus, particularly adapted for controlled heating of a moist food product P moving through a cabinet 301 on a conveyor 358, is illustrated in FIGS. XII–XVIII of the drawings.

Referring to FIGS. XII and XIII of the drawings, the cabinet 301 of the cooking apparatus comprises an outer shell having a top 302, sides 304 and 306, a bottom 308, a backwall 310, and a front wall 312. Doors 314 are hingedly connected by hinges 318 to frontwall 312 which has openings formed therein for access to the inside of the cooking apparatus 301.

To prevent transfer of heat through the walls of cabinet 301, an interior cabinet comprising a top 302', sides 304' and 306', a bottom 308', and back 310' is positioned inside the outer cabinet and insulating material 320 is positioned therebetween.

Means 385 are mounted in cabinet 301 for forming jets of heated air which are directed to impinge against a food product P, as will be more fully explained hereinafter.

As best illustrated in FIGS. XII and XIII of the drawing, a variable speed motor 330 has a drive shaft 331 which is connected to a driven shaft 334a of impeller 334 by suitable means such as a belt 333 and pulleys 333a and 333b. Shaft 334a extends through back walls 310 and 310' of cabinet 301.

Impeller 334 is mounted in a plenum 335 formed at one end of the cabinet 301. Impeller 334 draws air through air intake duct 336 from the cooking compartment 337 in cabinet 301.

A sheet metal wall 340, secured to the upper interior wall 302' and to intake duct 336 above plenum 335, forms exhaust plenum 338. Exhaust plenum 338 is formed behind the upper portion of cooking compartment 337 along the entire length of cabinet 301.

As more fully explained hereinafter, ducts 372 extend outwardly from wall 340 into cooking compartment 337 to deliver air from plenum 338 into the cooking compartment 337 above and below conveyor 358. Air is drawn through the air intake 336 by the impeller 334, exhausted into plenum 338, and delivered by ducts 372 to impinge against the food product and circulate back to air intake duct 336.

Heating elements 350 are arranged to heat air flowing into air intake duct 336 and are mounted in shroud 351. The heating element 350 may assume any suitable configuration, such as a flame heated exchanger, a steam heated device, or an electrical resistent heating element such as "Calrods" 50 hereinbefore described.

A thermostat sensor 352 is mounted in the plenum 338 through backwall 310 and interior backwall 310' and is connected to a suitable electrical circuit (not shown) for controlling the temperature of the heating elements 350.

Means to support the food product P comprises a continuous loop wire mesh conveyor 358 of conventional design. Conveyor 358 is moveably supported by rollers 360a and 360b adjacent one end of cabinet 301 and rollers 360c and 360d adjacent the other end of cabinet 301. The conveyor 358 passes through inlet passage 359 formed in the end wall 306 such that the food product P may be deposited on the upper portion of conveyor 358 adjacent end wall 306 and is passed through the oven and is discharged through outlet opening 362 and deposited on shelf 361 secured to end wall 304 of cabinet 301.

Suitable means for driving the conveyor 358 comprises a variable speed electric motor 364 which is drivingly connected to roller 360a by pulleys 364a, 366, and 370 and belts 368. Suitable means such as a rheostat (not shown) is provided for controlling the speed of conveyor drive motor 364. The rheostat may be calibrated to indicate the number of minutes the food product is to remain in the oven depending upon the requirements for cooking a particular food product P.

The temperature may be adjusted by a thermostat (not shown) which is controlled by the temperature sensor 352 located in plenum 338.

As best illustrated in FIGS. XI and XII of the drawing, outlet ducts 372 are spaced above and below conveyor 358 and are arranged to direct jets of heated air against the surface of the food product P on the conveyor 358, as will be more fully explained hereinafter.

As illustrated in FIGS. XIII–XVI of the drawings, ducts 372 preferably comprise a channel-shaped duct having a web 374a secured between spaced flanges 374b and 374c. An outwardly deflected portion of flanges 374b and 374c forms a shoulder 388 which has an upwardly extending portion 389 which spaces jet plate 385 from shoulder 388.

As best illustrated in FIG. XIV, the cross-sectional area of duct 372 is greater adjacent wall 340 and decreases along the length of duct 372. As will be hereinafter more fully explained, this allows for even pressure distribution of the heated air along the length of cavity 376 though air is discharged along the length of duct 372.

As best illustrated in FIGS. XIII and XIV of the drawings, a first perforated jet plate 385 is secured across the open side of duct 372. Plate 385 comprises a C-shaped channel (FIG. XV) having a web 385a secured between spaced flanges 385b and 385c. Flanges 385b and 385c have edges 386 which are slideably disposed over shoulders 388 on duct 372 to retain the jet plate 385 thereon. Jet plate 385 has a deflected end 385d to form an end wall in duct 372.

A plurality of perforations 390 are formed in plate 385 and are arranged in the pattern as illustrated in FIG. XIII.

A second plate 392 comprising a channel member, having a web portion 392a and upwardly extending flanges 392b and 392c, is slideably disposed in duct 372 and supported by shoulders 388 formed in the duct. Perforations 394 are formed in plate 392 which are axially aligned with perforations 390 in plate 385. It should be readily apparent that upwardly extending portions 389 of duct 372 and flanges 392b and 392c of plate 392 space jet plate 385 from plate 392 such that a column of air is formed as it passes through cavity 376, perforations 394, cavity 400 and out of perforations 390. This columnated jet of air is further restricted by the truncated cone-shaped nozzles 391 having a throat 391a formed interiorally thereof. The discrete columnated jet of air is directed to impinge upon the food product P as the food product is moved by the conveyor substantially perpendicular to the longitudinal axis of the columnated jet of air.

Means to reduce the effective diameter of the passage 394 through the second plate 392 comprises a third plate 396 which is slideably disposed in overlying position on plate 392. The third plate 396 is a substantially channel-shaped member having a web 396a secured between spaced flanges 396b and 396c. The upwardly extending flanges 396b and 396c space the third plate 396 from the first jet plate 385. The flanges of each plate 392 and 396 laterally align the apertures 398 and 394 formed in plates 396 and 392, respectively.

Means is provided to move plate 396 relative to plate 392 to control the effective size of the passage formed by perforations 394 and 398. As illustrated in FIG. XVI, a lug 402 is welded or otherwise secured to the third plate 396 adjacent opposite sides of a slot 414 formed in the outer end of web portion 396a of plate 396. Nut 404 is welded or otherwise secured to second plate 392 and is adapted to move within slot 414 formed in third plate 396. A socket headed cap screw 406 extends through passage 408 formed in lug 402 and is threadedly secured to nut 404. A collar 410 is secured by set screw 412 to screw 406 adjacent lug 402 to limit longitudinal movement of screw 406 relative to lug 402. Rotation of screw 406 moves lug 402 and plate 396 relative to nut 404 and plate 392.

A hole 387 is formed in deflected end 385d to allow adjustment of plates 392 and 396 relative to each other without removal of jet plate 385 from duct 372. Adjustment may be accomplished by use of a standard allen wrench or screwdriver depending upon the type of screw 406 used.

From the foregoing it should be readily apparent that rotation of impeller 334 forces air into plenum 338 and cavity 376 of each of the ducts 372.

As the air is passed through perforations 394 and 398 formed in plates 392 and 396, it passes into cavity 400. Movement of the air from perforations 398 through cavity 400 and through perforations 390 forms a discrete columnated jet of air which is directed to impinge against the food product P, carried by the conveyor, at a substantially 90° angle to the surface of the food product. The heated air transfers heat to the moist food product P and moves 90° relative to the longitudinal axis of the impinging column of air outwardly between the columns to the cooking compartment 337 in cabinet 301, as hereinbefore described and as illustrated in FIGS. VI and VIII. The air is then drawn through heating elements 350 into the air intake duct 336 by impeller 334.

FIGS. XVII and XVIII diagrammatically illustrate a portion of a food product P as it is moved by the conveyor 358. The area within the circle designated A is the surface of the food product as it is being cooked by the impinging column of air. The area within the outline designated B is the area which has been cooked and the rest of the area unmarked is represented as being uncooked by the single column of air. It should be readily apparent from FIG. XVIII that a crust having a predetermined thickness is formed and that the crust is tapered within the cooking area designated A. The perforations 390 in plate 385 are arranged in a pattern such that area A will overlap to progressively cook the entire surface area of food product P.

The rate of heat transfer is functionally related to the velocity of the jet of heated air and to the temperature of the jet of heated air impinging against the food product. It should be readily apparent that movement of plate 396 relative to plate 392 will effectively control the diameter of the passage formed by perforations 394 and 398. When perforations 394 and 398 are axially aligned, maximum air is passing through the passage and maximum velocity is achieved. Movement of the plates to disalign the axes of perforations 394 and 398 will reduce the size of the passage through the perforations therefore decreasing the velocity of the columnated jet of heated air impinging against the food product P to decrease the rate of heat transfer.

As hereinbefore explained, the columnated jet of heated air impinges against the surface of food product P, wiping the boundary layer of air, which would form an insulation barrier, from the food product P such that the rate of heat transfer from the columnated heated jet of air to the food product P is greater than the rate of migration of moisture from the center of the food product P to the exterior surface thereof. Therefore, the food product P is browned without excessively drying the food product P.

The illustrated embodiment of the oven 301 is designed to cook pizza. During the process of cooking pizza, about 75% of the heat is preferably transferred through the bottom of the pizza and about 25% of the heat is transferred through the upper surface thereof to properly brown the dough of the pizza and cook the toping. Three additional ducts 372 are provided below the conveyor 358 and the jets are individually adjusted to deliver 25% of the heated air to the top and 75% to the bottom surface of the pizza.

It should be readily apparent that passages in each duct 372 may be adjusted independently of passages in the other ducts to control the velocity and the amount of air delivered to the food product P.

Other food products may require a 50—50 ratio of the volume of heated air delivered to upper and lower surface of the food product. Therefore, an equal number of ducts would be positioned above and below the conveyor 358 or passages through some of the lower ducts could be closed.

It is also desirable to adjust passages in the ducts 372 adjacent inlet passage 359, where the food product P is introduced into the oven, such that the jets of air deliver more heated air than the other jets of air since the temperature differential is greatest at this point and the rate of heat transfer will be greater. Therefore, more moisture is present on the surface which must be removed to initiate browning.

For frozen pizza, the time required for thawing and cooking in the oven hereinbefore described will be approximately 5.5 minutes, but the time may vary depending upon the desired crispness of the crust.

From the foregoing it should be readily apparent that the apparatus hereinbefore described provides rapid heat transfer to or from external surfaces of food products and that the heat transfer can be well distributed over the surface of irregularly shaped products. The surface heating time can be equal to or less than that required for employment of microwave for heating interior portions of the product to accomplish rapid cooking of food products. When this rapid surface heating is coincident or sequenced with microwave internal heating, rapid and optimum food conditions can be obtained.

Other and further embodiments of the invention may be devised without departing from the basic concept thereof.

Having described my invention I claim:

1. A method of controlling heat transferred to a food product comprising the steps of: delivering microwave energy to heat the food product; forming a plurality of streams of high velocity heated gas; directing each of the streams of high velocity heated gas perpendicular to the surface of the food product such that the streams of high velocity gas impinge against discrete areas on the surface of the food product, before gas in the streams is diffused, to wipe away the boundary layer of air and moisture from the discrete areas against which the streams impinge; and moving the food product relative to the streams of high velocity gas such that heat is transferred to the surface of the food product at areas upon which the streams of high velocity gas impinge to increase the temperature of the surface of the food product at the areas of impingement before the areas of impingement move out of impinging relation with the streams of high velocity gas.

2. A method of controlling heat transferred to a food product according to claim 1, including controlling the velocity and volume of high velocity gas forming the streams to vaporize moisture on the surface of the food product at a rate exceeding the rate at which moisture migrates to the surface of the food product from the interior of the food product.

3. A method of controlling heat transferred to a food product according to claim 1, including the step of: moving the food product relative to the streams of high velocity heated gas by supporting the food product on a stationary support and moving the streams of high velocity heated gas to sweep across the surface of the food product.

4. A method of controlling heat transferred to a food product according to claim 1, including the step of: moving the food product relative to the streams of high velocity gas by positioning the food product on a conveyor and moving the conveyor such that the streams of high velocity gas impinge against discrete areas on upper and lower surfaces of the food product.

5. A method of controlling heat transferred to a food product according to claim 4, including controlling the volume of heated gas which impinges against discrete areas on upper and lower surfaces of the food product such that the amount of heat transferred to the lower surface of the food product is different from the amount of heat transferred to the upper surface of the food product.

6. A method of controlling heat transferred to a food product according to claim 4, including controlling the volume of heated gas forming the streams of high velocity gas such that the streams of high velocity gas which initially impinge against the surface of the food product transfer a greater amount of heat than the streams of high velocity gas which subsequently impinge against the surface of the food product.

* * * * *